3,330,825
THIOPHENE COMPOUNDS
Kurt Thiele, Frankfurt am Main, and Klaus Posselt, Bergen-Enkheim, Germany, assignors to Deutsche Gold- und Silber-Scheideanstalt vormals Roessler, Frankfurt am Main, Germany
No Drawing. Filed Dec. 4, 1963, Ser. No. 328,050
Claims priority, application Germany, Dec. 8, 1962, D 40,471
1 Claim. (Cl. 260—240)

The present invention relates to novel thiophene compounds of the formula

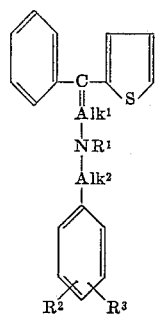

in which $Alk^1$ is a straight or branch chained alkylidene group of up to 4 carbon atoms, $Alk^2$ is a straight or branch chained lower alkylene group with at least 2 carbon atoms as a chain between the $NR^1$ and the phenyl group or such an alkylene group containing the hydroxyl group as a substituent, $R^1$ is hydrogen or lower alkyl and each of $R^2$ and $R^3$ is hydrogen, halogen, such as chlorine, hydroxyl or lower alkoxy, such as methoxy, and their addition salts with acids having pharmaceutically acceptable anions and quaternary ammonium compounds and process for their preparation.

The compounds according to the invention have valuable coronary dilating properties.

The compounds according to the invention, for example, can be prepared by cleavage of water from compounds of the formula

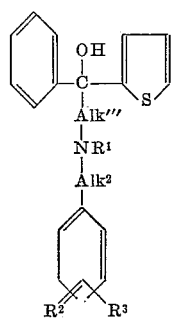

wherein $Alk'''$ represents an alkylene group and $Alk^2$, $R^1$, $R^2$ and $R^3$ have the same meaning as above. The production of such starting compounds is described in Ser. No. 236,733, filed Nov. 9, 1962, now Patent 3,251,858. Such method generally includes: Reacting a compound of the formula

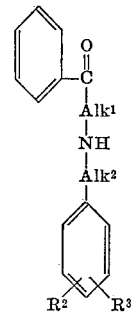

with

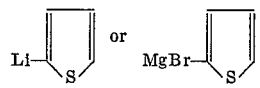

to form a compound of the formula

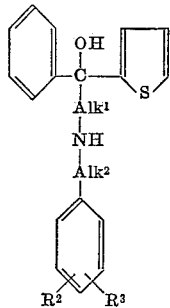

The compounds can also be prepared in various other ways, for example, a compound of the formula

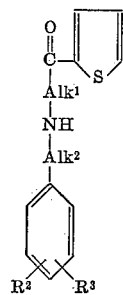

can be reacted with

to produce a hydroxy compound of Formula II.

The water cleavage preferably is effected in an acid, non-oxidizing medium preferably at a pH of 3 or less. In many instances it is expedient to employ elevated temperatures.

The free bases can be converted to their acid addition salts by reacting with organic or inorganic acids having pharmaceutically acceptable anions, such as acetic, hydrochloric, hydrobromic, hydriodic, sulfuric, phosphoric, citric, p-toluene sulfonic acids and the like. They also may

Example 1

The Grignard compound was prepared from 4.8 g. of magnesium filings (0.2 mol) and 31.4 g. of bromobenzene (0.2 mol) in dry ether. A suspension of 31 g. (0.1 mol) of 2-{N-[3'-thienyl-(2)-3'-oxopropyl-(1')]}-amino-3-phenyl-propane-HCl in ether was added dropwise to such Grignard compound solution. The resulting mixture was refluxed mildly for 4 hours and subsequently decomposed with NH₄Cl and water while cooling. The resulting 2-{N-[3'-phenyl-3'-thienyl-3'-hydroxy-propyl-(1)]}1-amino - 3 - phenyl-propane was isolated from the ether layer.

A solution of 40 g. of the isolated compound in 400 cc. glacial acetic acid was prepared and dry HCl gas introduced into such solution for 20 minutes. Subsequently the mixture was refluxed for 1 hour, the glacial acetic acid distilled off and the residue dissolved in water and rendered alkaline with ammonia. The 2-{N-[3'-phenyl-3'-thienyl-(2)-propene-(2')-yl-(1')]}-amino-3-phenyl - propane was isolated as an oil. The base was neutralized with isopropanolic HCl and the resulting HCl salt of the melting point 174° C. recrystallized from isopropanol. Its formula is

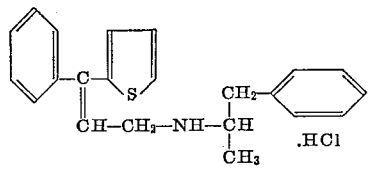

Example 2

Dry HCl was introduced into a suspension of 9 g. of 2 - {N - [3' - phenyl - 3'-thienyl-(2)-3'-hydroxypropyl-(1')]}-amino-3-(p-chlorophenyl) - propane - HCl in 100 cc. of glacial acetic acid until all suspended material was completely dissolved. After the glacial acetic acid had been distilled off from the reaction mixture the residue was rendered alkaline with concentrated ammonia and then extracted with a total of 500 cc. of ether and the extract dried. 7 g. (81% of theory) of the 2-{N-[3'-phenyl-3'-thienyl-(2) - propene-(2)-yl-(1')]} - amino-3-(p-chlorophenyl)-propanehydrochloride was obtained by treating the dried ether extract with isopropanolic HCl. After recrystallization from isopropanol its melting point was 193–194° C. Its formula is:

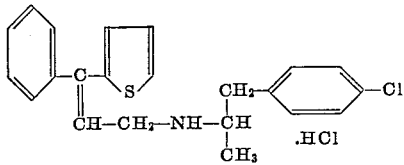

Example 3

The Grignard compound was prepared from 24.3 g. Mg filings (1 mol) and 163 g. of 2-bromothiophene in dry ether. A suspension of 159.7 g. (0.5 mol) of 2-{N-(3'-phenyl-3-oxo-propyl-(1')]} - amino - 3 - phenyl - 3 - hydroxypropane in ether was added dropwise to such Grignard compound solution. The reaction was completed immediately and the reaction mixture decomposed with NH₄Cl and water while cooling. The resulting 2-{N-[3'-phenyl-3-thienyl-(2)-3' - hydroxy - propyl-(1')]}-amino-3-phenyl-3-hydroxy-propane was recovered from the ether layer by fractional distillation. It distilled over in the fraction between 200 and 245° C. at 0.2 torr. Such compound could be crystallized with the aid of gasoline and a little benzine. The melting point of the crystalline free base was 72–73° C. The hydrochloride salt of the product after recrystallization from isopropanol had a melting point of 203° C.

36.7 g. (0.1 mol) of the free base thus prepared was dissolved in 63 cc. of glacial acetic acid and dehydrated by boiling 2 hours under reflux with hydrogen iodide in statu nascendi. The resulting solution was decolorized with sodium bisulfite and the acetic acid distilled off. The base was set free with ammonia. The crude 2-{N-(3' - phenyl-3' - thienyl-(2)-propene-(2')-yl-(1')]}-amino-3-phenyl-3-hydroxypropane was transformed into its hydrochloride salt and the latter recrystallized from isopropanol. The melting point thereof was 204° C.

The formula thereof is:

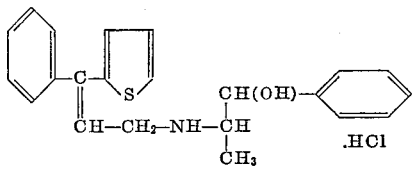

We claim:
A compound of the formula

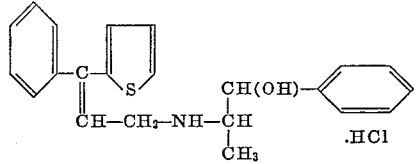

References Cited

UNITED STATES PATENTS 3,251,858   5/1966   Thiele et al. _____ 260—332.3

FOREIGN PATENTS 220,921   4/1959   Australia.
1,338,098   8/1963   France.
627,139   7/1949   Great Britain.

OTHER REFERENCES

Adamson: J. Chem., 1950, pp. 885–890.
Burger: Medicinal Chemistry, 2nd Edition, pp. 464 and 635–637, Interscience Publishers, Inc., New York (1950).
1,051,281 (February 1959), German printed application (4 pp. spec.).
83,520 (July 1964), Deutsche-Gold and Silber-France, 1 RE addition to France 1,338,098 (2 pp. spec.).

JOHN D. RANDOLPH, *Primary Examiner.*